3,013,531
VALVE
Carl H. Mueller, Pasadena Hills, and Victor G. Klein, Defiance, Mo., assignors to The McNeil Machine & Engineering Company, Akron, Ohio, a corporation of Ohio
Filed Feb. 25, 1960, Ser. No. 11,013
10 Claims. (Cl. 121—13)

This invention relates to valves, and more particularly to a quick-acting distribution valve for an air motor such as is used, for example, in a lubricant gun for driving a lubricant pump in the gun.

The invention is especially concerned wtih the provision of an improved quick-acting distributing valve for the air motor of a lubricant gun of the type such as is shown in Barks U.S. Patent 1,939,943, patented December 19, 1933, the principal object of the invention being the provision of a simplified valve construction which provides a positive, reliable snap action of the valve at the ends of the stroke of the piston of the air motor. It will be understood, however, that the valve construction of the invention is not limited to use in a lubricant gun such as mentioned, but may be useful in general for expansible-chamber air motors or other fluid motors, and may have other applications. A feature of the invention is that the snap action of the valve is accomplished by the use of magnets, these magnets also serving as valve heads of the valve construction. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is a view partly in side elevation and partly in longitudinal section of a lubricant gun in which the invention is incorporated;

Corresponding reference characters indicate corresponding parts throughout the several views of the drawings.

Figure 1:
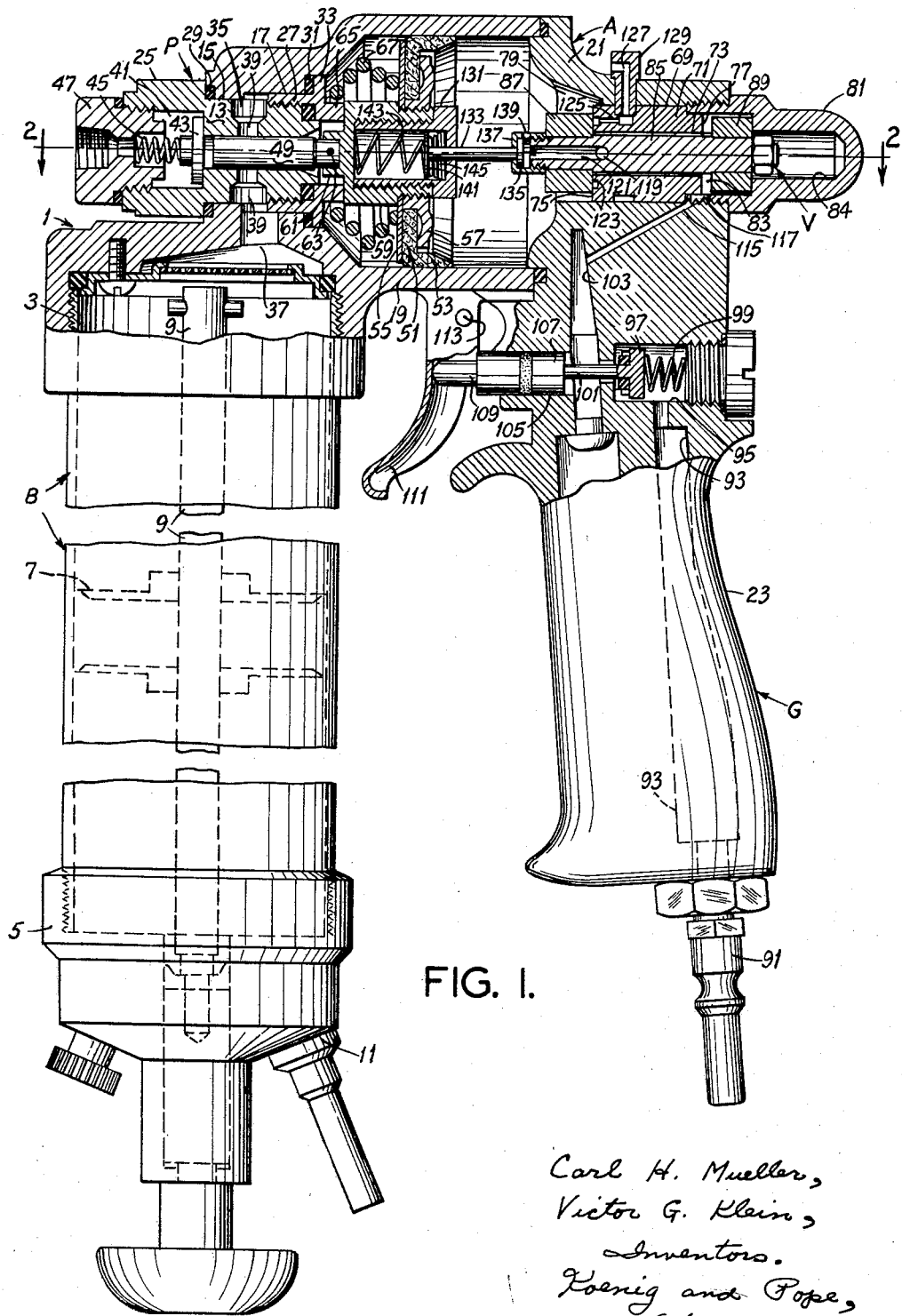

Referring to the drawings, a valve V of this invention is shown embodied in a lubricant gun G. The gun comprises a pump P powered by an air motor A for pumping lubricant from a lubricant container or barrel B. More particularly, the gun comprises a combination pump-motor body 1 formed with a socket 3 in which is threaded one end of the barrel B. The other end of the barrel is closed by a head 5. A follower 7 is slidable on a stem 9 in the barrel for forcing lubricant toward the pump P. Head 5 has a check-valved inlet 11 for admitting compressed air to the barrel for pressurizing the follower. This inlet is adapted for connection of an air hose thereto for delivering compressed air to the barrel.

The pump P comprises a pump cylinder 13 which extends at right angles to the barrel through a bore 15 and a counterbore 17 in the body 1. The counterbore 17 opens into motor cylinder 19, which is constituted by a lateral cylindrical extension of body 1. The outer end of motor cylinder 19 is closed by a head 21 formed integrally with a handle 23 which extends down alongside the barrel B. The pump cylinder 13 has an integral head 25 on the end thereof which extends out through bore 15 and is retained in the body 1 by a nut 27 threaded on its other end and fitting in the counterbore 17. Packing 29 is provided under head 25 and packing 31 is provided under a rim 33 on nut 27. The nut is shorter than counterbore 17 and there is an annular space 35 in body 1 around the pump cylinder 13 within the body 1. A passage 37 extends from the socket 3 to this annular space, and the pump cylinder has radial inlet ports 39 from this space to the bore in the pump cylinder. Pump cylinder head 25 has an axial recess 41 containing a discharge check valve 43. This is biased toward a seat at the inner end of the recess by a spring 45 reacting from an outlet fitting 47 threaded in the recess. A pump plunger 49 is slidable in pump cylinder 13 across the radial inlet ports 39.

A motor piston 51 is slidable in motor cylinder 19. This piston comprises packing 53 clamped between washers 55 and 57 on a cup-shaped hub 59, washer 55 engaging a shoulder on the hub and washer 57 being threaded on the hub. The hub has a tubular extension 61 receiving the right end of the pump plunger 49 as viewed in FIG. 3, this end of the plunger being pinned in extension 61 as indicated at 63. The left end of the hub is engageable with a tubular extension 65 on nut 27 to determine the left-hand limit of the stroke of the piston 51 and the pump plunger (see FIG. 1). Extension 65 is larger than extension 61 to accommodate the latter. Piston 51 is biased toward hte right, which is the direction for moving the pump plunger 49 through a return stroke, by a compression spring 67 reacting from nut 27 against the piston. Piston 51 is adapted to be moved toward the left, which is the direction for moving the pump plunger 49 through a discharge stroke, by admission of compressed air on the right side of the piston 51 under control of valve V.

The head 21 has a cylindrical hole 69 coaxial with cylinders 19 and 13. Press-fitted in this hole 69 is a cylindrical bushing 71 which is made of magnetic material, i.e., a material capable of being magnetized, such as a suitable steel. This bushing has an axial cylindrical passage 73 extending therethrough from one end to the other. The end surface 75 of the bushing around one end of passage 73 constitutes a first valve seat. The end surface 77 of the bushing around the other end of the passage constitutes a second valve seat. The inner end of hole 69 opens a first chamber 79 in head 21 at the right end of air cylinder 19. The outer end of hole 69 is closed by a cap 81 threaded therein and formed to provide a second chamber 83 at the right end of bushing 71. Chamber 83 is of larger diameter than passage 73 in bushing 71 and has an extension 84 in cap 81. This extension is of smaller diameter than chamber 83.

Figures 2, 3:
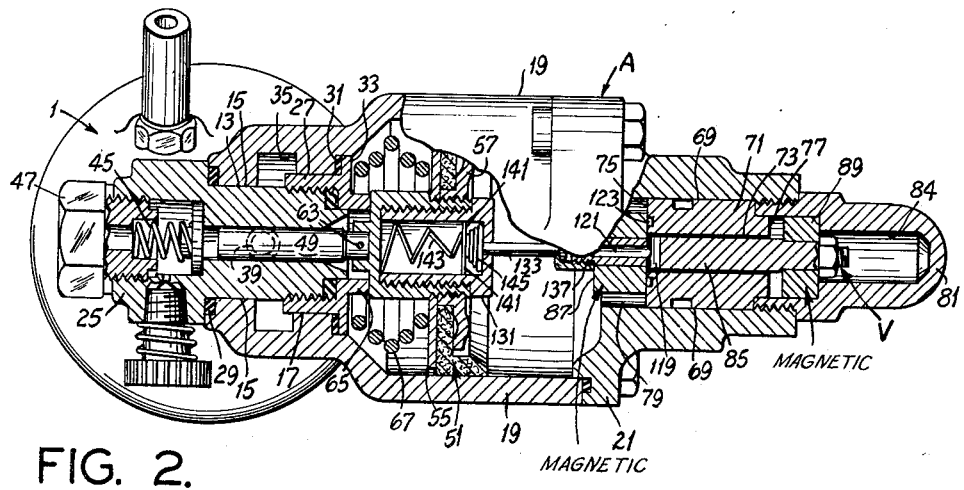
FIG. 2 is a section taken on line 2—2 of FIG. 1.
FIG. 3 is a fragment of FIG. 1 illustrating a moved position of parts.

A valve stem 85 is axially slidable in passage 73 in bushing 71. The stem is of smaller diameter than the diameter of passage 73 so that there is space around the stem for flow of air through the passage. A first valve head 87 is secured on the left end of stem 85 in chamber 79. A second valve head 89 is secured on the right end of stem 85 in chamber 83. Each valve head is a cylindrical permanent magnet made, for example, of a permanent magnet alloy such as that sold under the trade name Alnico. The valve heads are spaced on stem 85 a distance greater than the length of the bushing 71 so that the stem and heads are movable between a first position wherein the first head 87 engages the left end of the bushing (the first valve seat 75) and the second head 89 is spaced from the right end of the bushing (the second valve seat 77) as shown in FIGS. 1 and 2 and a second position wherein the second head 89 engages the second seat 77 and the first head 87 is spaced from the first seat 75 as shown in FIG. 3. Valve stem 85 is made of nonmagnetic material such as brass.

The handle 23, which is a pistol-grip type handle, has a nipple 91 at its lower end for connection of a compressed air hose. Nipple 91 delivers air to a passage 93 in the handle which communicates at its upper end with a valve chamber 95 in the handle. Chamber 95 contains a valve 97 biased toward closed position against a seat by a spring 99. Valve 97 has a stem 101 extending across an upwardly extending air passage 103 in the handle to a hole 105 drilled in from the side of the handle toward barrel B. Stem 101 contacts a head 107 having a sliding sealing fit in hole 105. Head 107 has a button 109 engageable by a trigger 111 pivoted at 113 on the bottom of cylinder 19. When the trigger is pulled, valve 97 is opened for flow of air upward through passage 103. From the upper end of passage 103 there is an angled passage 115 which communicates through a hole 117 in cap 81 with chamber 83. Valve stem 85 has a transverse passage 119 located between valve heads 87 and 89 and an axial passage 121 from transverse passage 119 to the inner end of the stem (the end of the stem toward the motor cylinder 19). Bushing 71 has an annular groove 123 in valve seat 75 and lengthwise passage 125 from groove 123 to a vent hole 127 which communicates with a vent tube 129 extending upward from head 21.

Hub 59 of motor piston 51 has a cap 131 threaded therein. A rod 133 extends from stem 85 through a hole in cap 131 into hub 59. Rod 133 has a head 135 at its end toward the stem 85 engageable by a nut 137 threaded on the end of the stem. This nut has an air hole 139 (see FIG. 1). Rod 133 also has a head 141 at its other end in hub 59. Coil compression springs 143 and 145 are provided in hub 59 on opposite sides of head 141, spring 143 reacting from the end of the hub against the left side of the head and spring 145 reacting from the cap 131 against the right side of the head.

Operation is as follows:

FIG. 1 shows valve 97 open, and valve stem 85 and valve heads 87 and 89 in the stated first position wherein head 87 engages seat 75 and head 89 is spaced from seat 77, and piston 51 and pump plunger 49 approaching the end of a pressure stroke. Air for driving the piston 51 toward the left as viewed in FIG. 1 is supplied to cylinder 19 on the right side of the piston via the compressed air hose (not shown) connected to nipple 91, passage 93, valve chamber 95, passages 103 and 115, hole 117, valve chamber 83, the space in passage 73 around valve stem 85, passages 119 and 121 and hole 139 in nut 137. As the piston travels toward the left, valve stem 85 remains in its first position, spring 145 becoming more and more compressed. As the piston 51 nears the left end of its stroke, spring 145 becomes substantially fully compressed and then piston 51 becomes effective to overcome the magnetic attraction between valve head 87 and bushing 71 and pulls valve stem 85 to the left via rod 133. This moves valve head 87 away from seat 75 and moves valve head 89 toward seat 77. As soon as head 87 is far enough away from seat 75 for the magnetic attraction between head 87 and seat 75 to be substantially diminished, head 89 moves close enough to seat 77 for the magnetic attraction between head 89 and seat 77 to be greatly increased. At this point, the valve stem 85 completes its movement toward the left with snap action, due to the magnetic attraction between head 89 and seat 77. This snap action of the valve stem, during which it moves faster than piston 51, is permitted by reason of the fact that rod 133 has a lost-motion connection at 135 with the valve stem and at 141 with piston 51.

Thus, when piston 51 reaches the end of a stroke to the left (a pressure stroke of pump plunger 49), valve stem 85 and valve heads 87 and 89 are snapped from their stated first position to their stated second position (FIG. 3) wherein valve head 89 engages valve seat 77 and valve head 87 is spaced from seat 75. Accordingly, air in cylinder 19 on the right of piston 51 is vented via valve seat groove 123, passage 125, hole 127 and vent tube 129, and spring 67 drives piston 51 toward the right to pull the pump plunger 49 back through a return stroke. As the piston 51 moves toward the right, valve stem 85 remains in the stated second position (the lost-motion connection between rod 133 and piston 51 permitting this) until piston 51 approaches the right end of its stroke. At this point, spring 143 becomes substantially fully compressed and then piston 51 becomes effective to push rod 133 and valve stem 85 to the left. This moves valve head 89 away from seat 77 and moves valve head 87 toward seat 75. As soon as head 89 is far enough away from seat 77 for the magnetic attraction between head 89 and seat 77 to be substantially diminished, head 87 moves close enough to seat 75 for the magnetic attraction between head 87 and seat 75 to be greatly increased. Accordingly, valve stem 85 completes its movement to the right with snap action, due to magnetic attraction between head 87 and seat 75. Thus, valve stem 85 and heads 87 and 89 thereon are snapped back to the stated first position for repetition of the cycle.

The permanent magnet valve heads 87 and 89 (on the nonmagnetic valve stem 85) are preferably permanently magnetized in such manner that their magnetic poles are at their flat ends (instead of on a diameter). It is conceivable that bushing 71 may be a permanent magnet and valve heads 87 and 89 be made of magnetic material (such as a suitable steel). Valve seats 75 and 77 and the faces of valve heads 87 and 89 opposed thereto may be lapped for very tight sealing but this is not essential, particularly in the lubricant gun application of valve V where slight leakage of air is not critical. It is also possible that ordinary packings, such as O-rings, could be used for tight sealing between the valve heads and seats.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. Valve means comprising a valve seat member and a valve head movable toward and away from the valve seat member, one of which is a permanent magnet and the other of which is made of magnetic material, and valve actuating means for moving said valve head toward and away from said valve seat member and including a lost-motion connection permitting said valve head to snap against the seat due to magnetic attraction when the valve head is moved close enough to the valve seat member for attraction of the head to the seat member.

2. Valve means as set forth in claim 1 wherein the valve head is the permanent magnet.

3. A valve comprising a body, a valve stem slidable in a passage in said body, said body having first and second chambers at opposite ends of said passage and first and second valve seat members around the opposite ends of said passage, a first valve head member on said stem in the first chamber and a second valve head member on said stem in the second chamber, said head members being spaced on said stem a distance greater than the length of said passage so that the stem and head members are movable between a first position wherein the first head member engages the first seat member and the second head member is spaced from the second seat member and a second position wherein the second head member engages the second seat member and the first head member is spaced from the first seat member, one of said first members being a permanent magnet and the other being made of magnetic material, one of said second members being a permanent magnet and the other being made of magnetic material whereby said head members are magnetically attractable toward said seat members for snap action thereof.

4. In an air motor comprising a cylinder, a piston slidable in the cylinder, a spring biasing said piston toward one end of the cylinder, and a head at said one end of the cylinder, valve means for said motor comprising a magnetic bushing in said head coaxial with said cylinder and piston, the end of the bushing toward the cylinder constituting a first valve seat and its other end constituting a second valve seat, said head having a chamber at said other end of the bushing and an air passage for delivery of air to said chamber, a nonmagnetic valve stem slidable in said bushing, a first permanent magnet constituting a first valve head on the end of the stem toward said cylinder engageable with the first valve seat, a second permanent magnet constituting a second valve head on the other end of the stem in said chamber, said heads being spaced on said stem a distance greater than the length of said bushing so that the stem and heads are movable between a first position wherein the first head engages the first seat and the second head is spaced from the second seat and a second position wherein the second head engages the second seat and the first head is spaced from the first seat, and a lost-motion connection between said stem and piston, said stem and bushing being formed for delivery of air from said chamber to the cylinder when said stem and heads are in first position and for venting of air from the cylinder when said stem and heads are in second position.

5. In air air motor as set forth in claim 4, said piston having a hollow hub, said lost-motion connection comprising a rod extending from said stem into said hub, said rod having a head in said hub, and compression springs in said hub acting on opposite sides of said head on the rod.

6. Valve means comprising first and second valve seats and a valve stem carrying first and second valve heads for movement between a first position wherein the first head engages the first seat and the second head is spaced from the second seat and a second position wherein the second head engages the second seat and the first head is spaced from the first seat, said heads being permanent magnets and said seats being magnetic, whereby said heads are magnetically attractable toward said seats for snap action thereof.

7. Valve means as set forth in claim 6 comprising valve actuating means for moving said stem in one direction or the other for initiating movement of said stem from one position to the other and including a lost-motion connection permitting the first head to snap against the first seat when moved toward the first seat and permitting the second head to snap against the second seat when moved toward the second seat.

8. A valve comprising a body, a valve stem slidable in a passage in said body, said body having first and second chambers at opposite ends of said passage and first and second valve seats around the opposite ends of said passage, a first valve head on said stem in the first chamber and a second valve head on said stem in the second chamber, said heads being spaced on said stem a distance greater than the length of said passage so that the stem and heads are movable between a first position wherein the first head engages the first seat and the second head is spaced from the second seat and a second position wherein the second head engages the second seat and the first head is spaced from the first seat, said heads being permanent magnets and said stem being nonmagnetic, said heads being magnetically attractable toward said seats for snap action thereof.

9. A valve seat as set forth in claim 8 wherein said stem has a passage through said first head in communication with the passage in the body, and wherein fluid may flow from the second chamber through said passages when the stem and heads are in said first position.

10. A valve as set forth in claim 9 wherein said body has a passage from said first seat through which fluid may flow from said first chamber when said stem and heads are in said second position.

References Cited in the file of this patent

UNITED STATES PATENTS

| | | |
|---|---|---|
| 2,372,813 | Darling | Apr. 3, 1945 |
| 2,638,125 | Parsons | May 12, 1953 |
| 2,811,979 | Presnell | Nov. 5, 1957 |
| 2,886,063 | Ray | May 12, 1959 |
| 2,898,936 | Collins | Aug. 11, 1959 |
| 2,924,242 | White | Feb. 9, 1960 |